J. G. CLAUS.
AUTOMATIC EXTENSION CAR STEP.
APPLICATION FILED AUG. 31, 1914.
1,190,861.
Patented July 11, 1916.
3 SHEETS—SHEET 1.
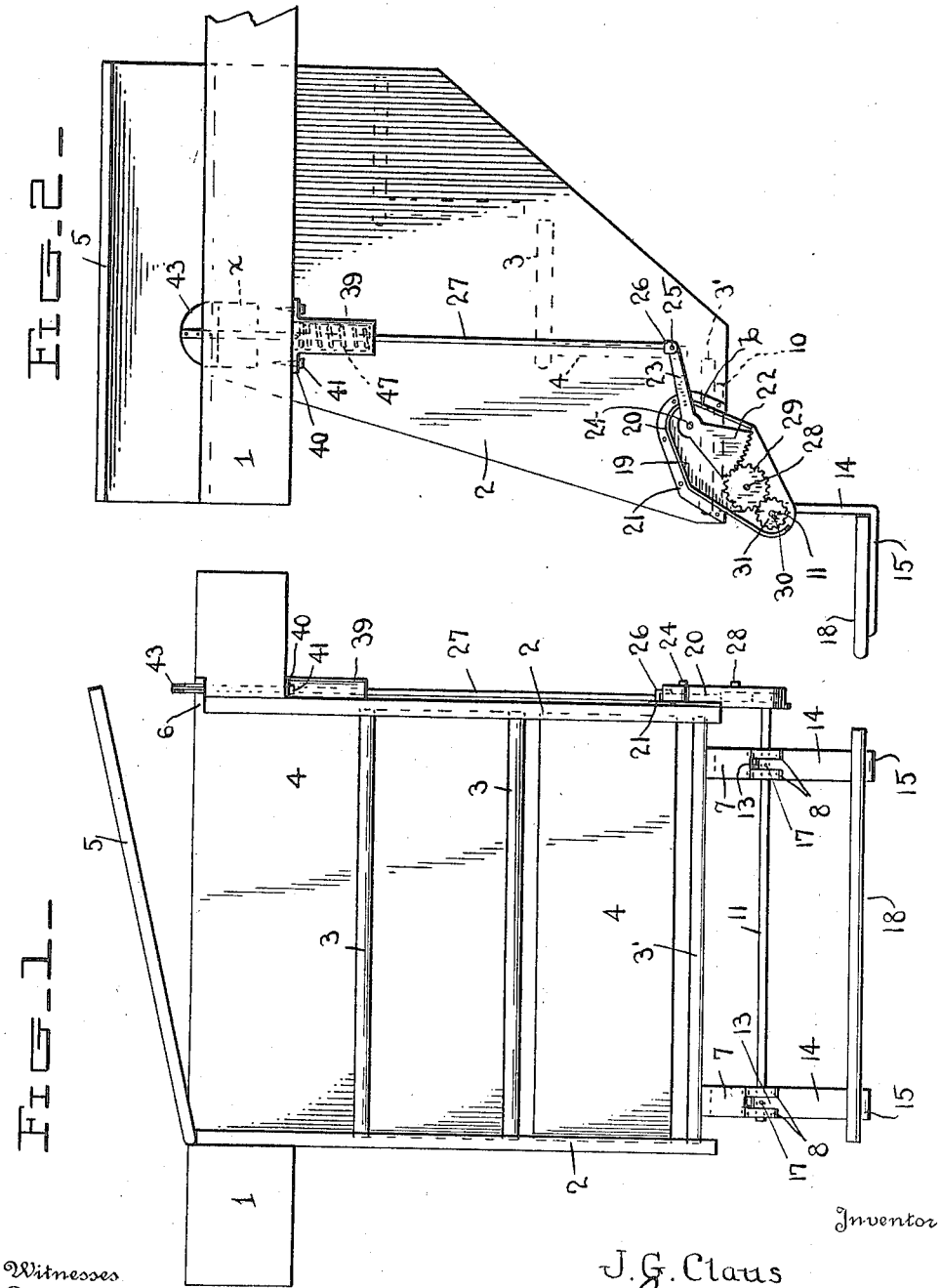

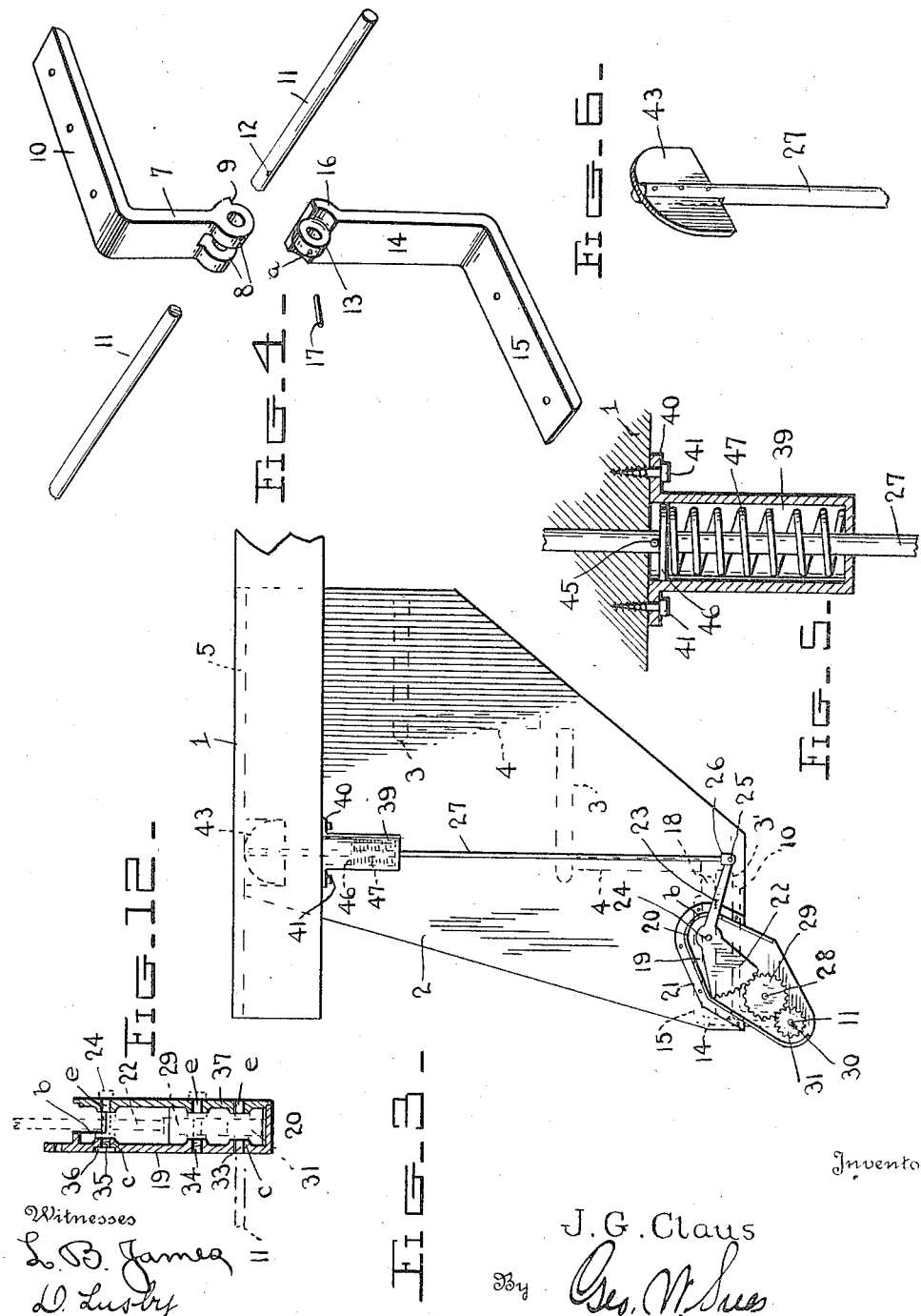

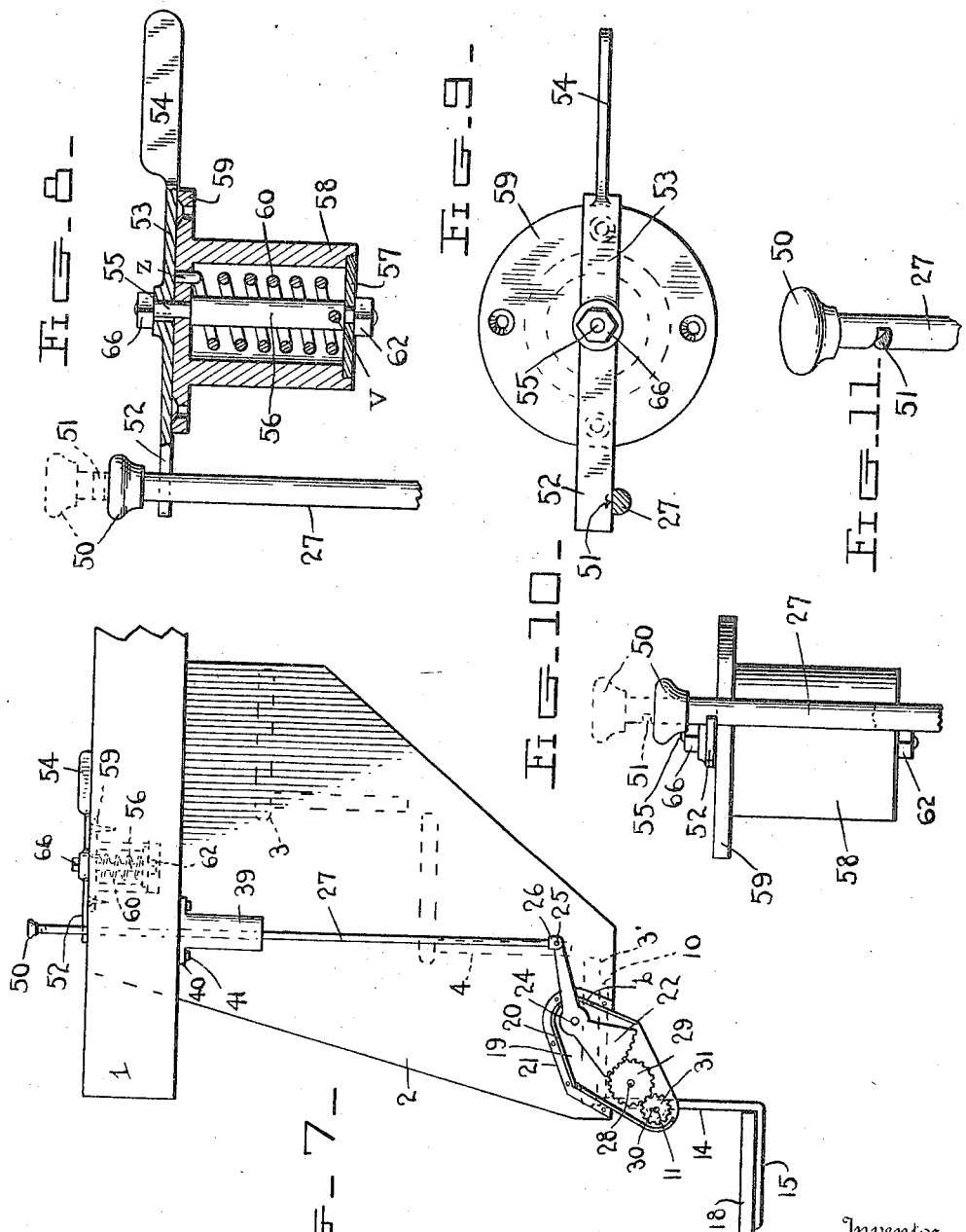

UNITED STATES PATENT OFFICE.

JOHN G. CLAUS, OF PLATTSMOUTH, NEBRASKA.

AUTOMATIC EXTENSION CAR-STEP.

1,190,861. Specification of Letters Patent. Patented July 11, 1916.

Application filed August 31, 1914. Serial No. 859,389.

*To all whom it may concern:*

Be it known that I, JOHN G. CLAUS, a citizen of the United States, and a resident of Plattsmouth, in the county of Cass and State of Nebraska, have invented certain new and useful Improvements in Automatic Extension Car-Steps, of which the following is a specification, reference being had to the accompanying drawings, forming a part of this specification.

This invention relates to certain new and useful improvements in automatic extension car steps, employed in connection with passenger cars and coaches; and the object of my invention is to provide a passenger car with a swinging auxiliary car step, which can be instantly thrown into or out of working position, the step being arranged to add one tread to the length of the permanent car step.

Another object is to provide a passenger car step with an auxiliary step arranged to fold upon the lowermost tread of the fixed car step, so that when unloading or loading passengers, the car step can be prolonged one step or tread.

A further object is to provide a car step which while not in use is folded upon the bottom of the fixed step, to be automatically thrown out into working position on raising the trap normally covering the car step.

A still further object is to provide a vestibuled car with a spring actuated step normally held in working position, but being instantly closed on lowering the trap.

With these and other objects in view, the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification, and in which like numerals of reference indicate similar parts in the several views: Figure 1 shows a front view of a vestibuled car step provided with an auxiliary step embodying my invention, the trap being shown as partly opened. Fig. 2 is an end view of Fig. 1. Fig. 3 is an end view showing the trap and step closed. Fig. 4 shows an enlarged detail of the rock shaft and the upper and lower brackets. Fig. 5 is an enlarged detached detail showing the spring operating the plunger rod. Fig. 6 is an enlarged detail disclosing the upper end of the plunger rod carrying the guard plate. Fig. 7 shows a modification where the device is used in connection with an open platform car. Fig. 8 shows a detached detail of the spring actuated detent used in the modification. Fig. 9 is a top view of Fig. 8 with the plunger head cut away. Fig. 10 is an end view of Fig. 8. Fig. 11 shows a detail of the upper end of the plunger rod as used in the modification. Fig. 12 is a central sectional view through the gear housing.

In my present invention I provide an auxiliary car step adapted to be used in connection with vestibuled cars, so arranged that on opening the trap door, the auxiliary car step is instantly thrown into working position.

My invention also includes a modification so that the auxiliary car step may be used in connection with open vestibuled passenger cars.

In the drawings, the numerals 1 indicate the end car timbers, 2, 2, the sides of the permanent car steps, 3, 3, the upper and 3' the lower permanent treads of the car step, 4 the risers and 5 the trap door covering the steps, as conventionally used in connection with vestibuled cars.

As shown, the trap door 5 at its free end is arranged to rest within a recess 6.

Secured to the under face of the lowermost car step 3' by means of suitable bolts, are the depending upper brackets 7, each having a slotted knuckle joint 8, as shown in Fig. 4, and an adjacent stop shoulder 9. By means of their apertured ends 10, these upper brackets are securely fixed to the lowermost tread or step 3'. As shown in Fig. 1, these depending upper brackets 7 are held in parallel spaced relation and revolubly carry the rock shaft 11, which at one end projects beyond the bracket.

The rock shaft 11 at suitable points is provided with pin openings 12, and held within the slotted knuckle joints 8 and upon the shaft 11 are the knuckle joints 13, of the lower brackets 14, which have the angular extensions 15 to which the auxiliary car step or tread 18 is secured. As shown in Fig. 4, these lower brackets have the stop shoulders 16 arranged for co-action with the stop shoulders 9, while the knuckle joints 13 have suitable openings *a*, arranged to receive the pins 17 which also pass through the openings 12 within the rock shaft 11, so that these lower brackets 14 are fixed to and are carried by the shaft 11. As shown each bracket is in the form of a L-shaped member, which are arranged to fold upon one another when the auxiliary car step is not in use.

Secured to the extensions 15 by means of suitable bolts is the auxiliary swinging tread or step 18. The lower brackets 14 are of such a length that when they are carried into an upward position, the auxiliary car step 18 will fold upon the lowermost fixed car tread 3', as shown in dotted lines in Fig. 3.

Secured to one of the sides 2, is a gear housing comprising a plate 19 having the outstanding flange 20 partly skirting the plate. As shown in Fig. 2, this plate 19 has a securing flange 21 by means of which the housing is secured to the side of the car step. The guard housing is oblong and the flange 20 does not extend over the bottom of the housing so as to provide an escape opening through which cinders or dust that may enter the housing will readily fall. At suitable points, as shown at b, Fig. 2, the flange 20 has an access opening within which is held the operating arm 23 of the gear sector 22. This gear sector 22 is held upon the pivot bolt 24 and at its end carries a pin 25 arranged to receive the bifurcated head 26 of the plunger rod 27, this construction being clearly shown in Figs. 2, 7 and 12.

Secured a suitable distance below the pivot bolt 24 is a pivot bolt 28 which supports the gear 29, while located below the pivot bolt 28 is the shaft end 11 giving support to the pinion 31, and this pinion 31 is fixed to the shaft 11, by means of a key 30.

In Fig. 12, I have shown a sectional detail of the gear casing and as shown, the base plate 19 is provided with the bearing bosses c. The base plate 19 is provided with the shaft opening 33, the threaded bolt opening 34 and the threaded opening 35. The opening 35 ends in a recess 36 within which is held the nut receiving the bolt 24. This is necessary, as this part of the base plate 19 lies flush with the side of the car step, and if the recess were not provided, an opening would have to be cut within the car step side 2.

Arranged to work upon the flange 20 is a face plate 37, this face plate having suitable openings e, through which the shaft 11 and bolts 28 and 24 pass the plate being held in place by means of the bolts 24 and 28.

As shown in Figs. 1 and 2, the plunger rod 27 passes through a spring housing 39 which has a securing flange 40 shown in detail in Fig. 5, through which suitable screws 41 pass in securing the housing to the under face of the end timber. The plunger rod is continued through the housing 39 and is arranged to project through the access opening 6, as shown in Fig. 1. The upper end of this plunger rod 27 is slotted and held within the slot is a semi-circular guard plate 42, which forms a skirt guard, preventing garments from catching on the projecting end of the plunger rod 27.

As shown in Fig. 5, near its upper end, the plunger rod 27 is provided with the pin 45 against which normally rests a washer 46 receiving the upward pressure of the spring 47 which at its lower end rests upon the bottom of the spring housing 39. By means of this spring the plunger rod 17 is normally held in a protracted position, so that its upper end will extend beyond the upper face of the end timber 1 and the platform of the car, as indicated in Fig. 1. In this position of the plunger rod, the auxiliary car step is in its working position, as shown in Fig. 1, the lower bracket being held by means of the contacting shoulders 9 and 16. As disclosed in Fig. 2, the timber 1 is provided with a slot x, within which the guard plate 43 slides, so that when the plunger rod is depressed, the plate 43 is carried beyond the upper surface of the end timber 1.

The operation of the invention is very simple. On raising the platform 5, the weight of the platform is removed from the upper end of the plunger rod 27, so that the spring 47 exerts an upward pressure upon the rod sufficient to throw the auxiliary step outward and over its balance, after which the weight of the step 18 throws the bar 27 upward, to hold the same in protracted position as indicated in Figs. 1 and 2. In this position of the rod 27, the permanent car step is provided with an auxiliary car step. However, as soon as the trap door 5 is closed, the weight of the trap door forces the plunger rod 27 downward resulting in the gear sector 23 sweeping upward to rotate the gear 29, which in turn rotates the pinion 31 to rock the shaft 11, throwing the auxiliary step upward and folding the same upon the lowermost permanent car step, 3'.

In Fig. 7 I have shown a broken portion of an open platform equipped with my auxiliary car step. In this instance, the step throwing mechanism is identical with the construction described in connection with the vestibuled car platform with the exception that the plunger rod 27 must be manually operated to throw the auxiliary step 18 into folded position. As shown in Fig. 11, the upper end of the plunger rod 27 is provided with a knob 50 and a suitable point below this knob is located a slot 51 and this slot 51 is arranged to receive the end 52 of a pivotally held detent 53 which has the upward extension 54 having a contacting surface, so that the detent may be pushed out of engagement with the slot 51. The spring 47 normally forces this rod 27 upward as in the previous case, the slot 51 being so located that when the step 18 is in proper position, this slot will register with the end 52 of the pivotally held detent 53. This detent 53 is spring actuated in that the same is splined to the reduced end 55 of the stub shaft 56, which has its lower end extending through the bottom 57 of a spring casing 58, having the securing flange 59. Near its upper end, this casing has an opening arranged to receive the end $z$, of the coil spring 60 which has its remaining end $v$, held within an opening of the stub shaft 56 as clearly shown. The plate 57 is held in position by means of a bolt 62 secured to the end of the shaft 56. By this means, the end 52 is normally in contact with the plunger rod 27, resting either within the slot 51 or against the side of the rod. When the auxiliary step 18 is lowered, as shown in Fig. 7, the slot 51 is held a suitable distance above the engaging end 52 of the detent. However, when the lower tread 18 is folded the operator treads upon the bar 27 to force the same downward until the step 18 folds upon the lowermost car step 3', in which position the slot 51 will register with the detent 53 to hold the same in locked position. To bring the step into working position, the operator simply shoves the detent 54 out of engagement with the slot 51 against the tension of the spring 60, so that the spring 47 will throw the plunger bar 27 upward to bring the auxiliary tread into working position.

The detent 53 is held in position by means of the bolt 66.

The device is simple and inexpensive in construction and both durable and efficient in operation, and the auxiliary car step can be thrown into or out of working position with ease, accuracy and despatch.

Having thus described my said invention what I claim as new and desire to secure by U. S. Letters Patent is:—

1. The combination with a car step, of depending brackets secured thereto each having a stop shoulder, a shaft carried by said brackets, lower brackets each having stop shoulders for co-action with said first mentioned stop shoulders said lower brackets secured to said shaft, a tread secured to said lower brackets, a pinion secured to said shaft, and a pivotally held gear sector meshing with said pinion having an outstanding operating arm.

2. The combination with a car step, of depending brackets secured thereto, a shaft carried by said brackets, lower brackets secured to said shaft, a tread secured to said lower brackets, a pinion upon said shaft, a pivotally held gear sector in mesh with said pinion having an outstanding arm, and an operating arm extending from said outstanding arm.

3. The combination with a car step, of depending brackets secured to said step, a shaft carried by said depending brackets, lower brackets fixed to said shaft, a tread carried by said lower brackets, said tread held upon said car step in one position of said lower brackets, a pinion upon said shaft, a pivotally held gear sector in mesh with said pinion having an outstanding arm, a plunger rod secured to said arm, and a spring to normally force said plunger rod in one direction to hold said tread upon said car step.

4. In combination, a car step, brackets depending from said step, a shaft carried by said brackets, lower brackets fixed to said shaft, a pinion secured to said shaft, a pivotally held gear sector in mesh with said pinion having an outstanding arm, a housing and plunger rod secured to said arm and passing through said housing, and a spring within said housing working against said plunger rod to force the same in one direction to hold said tread upon said step.

5. In combination, a car step, of depending brackets secured to said step each having a stop shoulder, a shaft carried by said brackets, lower brackets each having stop shoulders arranged for co-action with said first mentioned shoulders and keyed to said shaft, a tread carried by said lower brackets, a pinion secured to said shaft, a pivotally held gear meshing with said pinion, and a pivotally held gear sector having an outstanding operating arm.

6. The combination with a car step, of depending brackets secured to said car step, having stop shoulders, a shaft carried by said brackets, lower brackets keyed to said shaft arranged to stop against said shoulders, a tread secured to said lower brackets, a pinion upon said shaft, a gear meshing with said pinion, a gear sector having an outstanding arm in mesh with said gear, a plunger rod secured to said outstanding arm, and a spring to normally force said plunger rod in one direction.

7. The combination with a car step, of depending brackets secured to said step having stop shoulders a shaft carried by said brackets, lower brackets secured to said shaft and stopped at times against said shoulders, a tread secured to said lower brackets, a gear sector meshing with said pinion having an outstanding arm, a plunger rod secured to said arm, a spring to normally force said plunger rod into protracted position, and a trap door arranged to rest upon said plunger rod to hold the same in retracted position against the tension of said spring.

8. The combination with a car step, of depending brackets secured to said step having stop shoulders, a rock shaft carried by said brackets, lower brackets secured to said shaft and arranged to stop against said shoulders, a tread secured to said lower brackets, a pinion secured to said shaft, a gear sector meshing with said pinion having an outstanding arm, a plunger rod secured to said arm having a notch, a spring to normally force said plunger rod into protracted position and a spring actuated detent arranged to engage within said notch.

9. The combination, with a car step of depending brackets secured to said step having stop shoulders, a shaft carried by said brackets, lower brackets secured to said shaft arranged at times to stop against said shoulders, a tread secured to said lower brackets, a pinion secured to said shaft, a pivotally held gear sector having an outstanding arm in mesh with said pinion, a plunger rod secured to said arm, a spring to normally force said plunger rod into protracted position, said plunger rod having a slot, a pivotally held stop shaft, and a spring to normally force said stop shaft in one direction, and a detent secured to said stop shaft arranged to engage within said slot, as and for the purpose set forth.

In testimony whereof I affix my signature, in the presence of two witnesses.

JOHN G. CLAUS.

Witnesses:
WM. A. ROBERTSON,
MAE MURPHY.

Copies of this patent may be obtained for five cents each, by addressing the "Commissioner of Patents, Washington, D. C."